US008756988B2

(12) United States Patent
Paulraj et al.

(10) Patent No.: US 8,756,988 B2
(45) Date of Patent: Jun. 24, 2014

(54) SYSTEM AND METHOD FOR GAS DISTRIBUTION MEASUREMENT FOR ELECTROSTATIC PRECIPITATOR

(75) Inventors: Blooshee Arulsingh Paulraj, Tamil Nadu (IN); Nanda Kishore Dash, Orissa (IN); Pankaj Kumar Gupta, Rajasthan (IN)

(73) Assignee: ALSTOM Technology Ltd, Baden (SE)

( * ) Notice: Subject to any disclaimer, the term of this patent is extended or adjusted under 35 U.S.C. 154(b) by 140 days.

(21) Appl. No.: 13/511,495

(22) PCT Filed: Mar. 2, 2010

(86) PCT No.: PCT/EP2010/052591

§ 371 (c)(1), (2), (4) Date: May 23, 2012

(87) PCT Pub. No.: WO2011/063996

PCT Pub. Date: Jun. 3, 2011

(65) Prior Publication Data

US 2012/0279293 A1 Nov. 8, 2012

(30) Foreign Application Priority Data

Nov. 26, 2009 (IN) .......................... 2435/DEL/2009

(51) Int. Cl.
*G01F 7/00* (2006.01)

(52) U.S. Cl.
USPC ........................................................ 73/195

(58) Field of Classification Search
USPC .................. 73/195, 863.82, 861.01–861.03; 55/106, 104; 96/74
See application file for complete search history.

(56) References Cited

U.S. PATENT DOCUMENTS

| | | | |
|---|---|---|---|
| 3,977,848 A | 8/1976 | Oliphant | |
| 4,181,509 A * | 1/1980 | Honacker et al. | 96/18 |
| 4,598,292 A * | 7/1986 | Devino | 340/973 |
| 4,854,167 A | 8/1989 | Czarnocki et al. | |
| 4,860,583 A * | 8/1989 | Olson | 73/204.15 |
| 5,507,192 A * | 4/1996 | Beaudin | 73/863.33 |
| 5,547,495 A * | 8/1996 | Wright | 96/74 |
| 5,797,105 A * | 8/1998 | Nakaya et al. | 701/7 |
| 6,516,676 B1 * | 2/2003 | Mullowney, Jr. | 73/863.82 |
| 6,940,425 B2 * | 9/2005 | Frantz | 340/963 |

(Continued)

FOREIGN PATENT DOCUMENTS

| | | | |
|---|---|---|---|
| CN | 2788902 | Y | 6/2006 |
| CN | 2795517 | Y | 7/2006 |
| CN | 10131860 | A | 12/2008 |
| WO | 2007/048420 | | 5/2007 |

OTHER PUBLICATIONS

Brückner, et al., "*The Active NPC Converter and Its Loss-Balancing Control*", IEEE Transactions on Industrial Electronics, vol. 52, No. 3, Jun. 2005.

(Continued)

*Primary Examiner* — Jewel V Thompson
(74) *Attorney, Agent, or Firm* — Rita D. Vacca

(57) ABSTRACT

The present invention relates to a method for carrying out measurement of gas distribution in an ESP and also relates to a gas distribution measurement system for measurement of gas velocities in an ESP. The gas distribution system (8) comprises probe carrier (9) that moves in the ESP 1, air velocity probe (10) that record the air velocity readings and a display controller (11).

10 Claims, 6 Drawing Sheets

(56) References Cited

U.S. PATENT DOCUMENTS

| | | | | |
|---|---|---|---|---|
| 7,328,624 | B2 * | 2/2008 | Gysling et al. | 73/736 |
| 7,421,911 | B2 * | 9/2008 | Desrochers et al. | 73/863.03 |
| 2008/0184769 | A1 | 8/2008 | McKinney | |

OTHER PUBLICATIONS

Teichnamm, et al., "*A Comparison of Three-Level Converters Versus Two-Level Converters for Low-Voltage Drives, Traction and Utility Applications*", IEEE Transactions on Industry Applications, vol. 41, No. 3, May/Jun. 2005.
Schweizer, et al, "*Comparison of the Chip Area Usage of 2-level and 3-level Voltage Source Converter Topologies*", IECON 2010—36th Annual Conference on IEEE Industrial Electronics Society, Nov. 7-10, 2010, pp. 391-396.
Asiminoaei, et al., "*Evaluation of Harmonic Detection Methods for Active Power Filter Applications*", Applied Power Electronics Conference and Exposition, 2005, Twentieth Annual IEEE Conference: Mar. 6-10, 2005, vol. 1, pp. 635-641.
Stupar, et al., "*Advanced Setup for Thermal Cycling of Power Modules Following Definable Junction Temperature Profiles*", Power Electronics Conference (IPEC), 2010 International Date of Conference: Jun. 21-24, 2010, pp. 962-969.
Anzawa, et al., "*Power Cycle Fatigue Reliability Evaluation for Power Device Using Coupled Electrical-thermal-mechanical Analysis*", 11th Intersociety Conference on Thermal and Thermomechanical Phenomena in Electronic Systems, 2008, Conference: May 21-28, 2008, pp. 815-821.
Friedli, et al., "*A Semiconductor Area Based Assessment of AC Motor Drive Converter Topologies*", Twenty-Fourth Annual IEEE Applied Power Electronics Conference and Exposition, Conference: Feb. 15-19, 2009, pp. 336-342.
Ma, et al., "*The High Efficiency Transformer-less PV Inverter Topologies Derived From NPC Topology*", 13th European Conference on Power Electronics and Applications, Conference: Sep. 8-10, 2009, pp. 1-10.
Takeshita, et al., "*PWM Control and Input Characteristics of Three-phase Multi-level AC/DC Converter*", 23rd Annual IEEE Power Electronics Specialists Conference, Conference: Jun. 29-Jul. 3, 1992, pp. 175-180, vol. 1.
Bailey, et al., "*Reliability Analysis for Power Electronics Modules*", 30th International Spring Seminar on Electronics Technology, Conference: May 9-13, 2007, pp. 12-17.
Chinese Office Action/Search Report dated Mar. 27, 2014 corresponding to CN Application No. 201080062475.3.

* cited by examiner

SYSTEM AND METHOD FOR GAS DISTRIBUTION MEASUREMENT FOR ELECTROSTATIC PRECIPITATOR

FIELD

The present invention relates to a method for carrying out measurement of gas distribution in an automated manner in an electrostatic precipitator.

The present invention also relates to a gas distribution measurement system for measurement of gas distribution in an electrostatic precipitator

BACKGROUND

Combustion of coal, industrial waste, domestic waste, oil, peat, biomass etc. produces flue gas that contains dust particles. Emission of the dust particles to ambient air needs to be kept at a low level and electrostatic precipitators (herein after referred to as "ESP") are the most widely used equipment to precipitate the dust particles suspended in the flue gas. To obtain the optimum collection efficiency of an ESP, the flue gas entering it from the inlet duct must be uniformly distributed over the ESP's entire cross section. An inlet transition nozzle is used at the entrance to reduce the gas velocity. The gas flow is then evenly distributed in the ESP by gas screens placed at the inlet. After the gas screens, the flue gas passes along the length of the ESP through passage between the electrodes, which are stacked in parallel along the width of the ESP. There are two types of electrodes namely, collecting electrodes and discharge electrodes that are placed in alternate fashion. Different sizes of collecting electrodes are used depending upon the design and the size of the ESP. The gaps between two collecting or emitting electrodes are standardized in ranges from 250 to 600 mm. The set of electrodes are grouped in so-called fields which are arrangements of bus sections perpendicular to the gas flow that are energised by one or more high voltage power supplies. The smallest portion of the ESP which can be independently energised is called a bus section. The charged dust particles between the discharge and the collecting electrodes are attracted by and collected on the collecting electrodes plates. The collecting electrode plates are occasionally rapped to make the collected dust release from the plates. Subsequently the dust falls down into the hoppers from which it is transported for further use or disposal. The dust free gas is then emitted to the ambient air via a stack.

In order to evaluate the uniformity of the distribution of the flue gas in an ESP, a 'Gas Distribution Test' is generally conducted inside the ESP. In such a test, the flue gas velocity is measured over the entire cross section of the ESP and then the coefficient of variant 'CV' is calculated from the velocity values to represent the flow variation in the ESP statically. This test is conducted offline (with air) and conventionally it is done manually by person(s) who take(s) the measurement of the air velocity over the ESP cross section. The necessary airflow for the measurement is generated in the ESP using an Induced Draft (ID) fan. The person then compiles all the data to calculate the $C_V$. Depending on the size of ESP, this conventional way of measurement can take up to 8 hours for completing the test for two persons. This time includes the time taken for manual measurement, feeding data to the computer, compilation and reporting of the result.

Inside of an ESP, the space available for access/movement of persons is generally either between two fields or between the screen plates and the field. Access can be made either from the roof side or from the hopper side of the ESP depending upon its design. In some ESP, a horizontal ladder is installed for walking between the fields. For some other designs there are even no walkways. Most of the ESP has a manhole opening for the entry which is rather small.

While conducting the gas distribution test, all manholes are closed to avoid leakage of air from outside. The person needs to carry a light into the ESP for illumination. As gaps are very small, working conditions are very difficult for manual work. Large ESP can be up to 15 m high and for measurements the operator has to climb at such heights either through ladders in small space or use scaffoldings, which are dangerous from the safety point.

Additionally the inside of the ESP is very dusty due to dust from the flue gas which remained stuck and deposited on the various ESP components.

Process of taking reading manually is very long and monotonous. As large ESP generally have quite a high number of collecting electrodes, the total number of measurements is also a high figure.

Accuracy some times is not the best as the present method cause human fatigue. In very large ESP, to keep the efforts reasonable, measurements are done at lesser measurement points (generally by skipping alternate points). This affects the quality of results adversely. Collection of data is not accurate as manually person measuring the data from heights has to record with the help of another person standing down by hear say. This lead to sometimes either wrong recording of data or few missed points while recording. In few ESP designs, where human access is difficult due to small gaps, direct measurement of gas distribution is even not feasible.

Also the dust from the flue gas which remained stuck on the components and the walls of the ESP makes the movement much more difficult for operators. This dusty environment also poses a health risk to the operator which increase with residence time of operator in the ESP.

For the fore going reasons, there is a need for a method for carrying out measurement of gas distribution in an ESP in fully safe, fast and accurate manner and a system for successful implementation of the method.

SUMMARY

The object of the invention is to carry gas distribution measurements in any kind of ESP, including large ESP (covering large fields and large numbers of collecting electrodes (with high heights)) with a minimal residence time of the operator inside the ESP while collecting a larger and more accurate quantity of data. The results of the gas distribution shall enable to fine tune the ESP in a way that particle collection efficiency is increased as well as the lifetime of certain components.

The method for measuring gas distribution in an ESP having at least one collecting electrode includes the steps of installing inside the ESP, at least one probe carrier comprising of at least one air velocity probe adapted to collect and record air velocity readings; the probe carrier being remotely controlled and removable, mounting the probe carrier on the surface of the collecting electrode; moving the probe carrier along the collecting electrode surface covering full height of ESP, the probe carrier move being controlled remotely by a display controller, capturing and recording a plurality of air velocity readings while moving the probe carrier along the surface of the collecting electrode, and like this repeating this procedure on other collecting electrodes sufficient times to cover entire cross section of the electrostatic precipitator.

The measurement of gas distribution in ESP is then simplified and allows quicker results. The present method not only ensures the safety of the operator but also improve significantly the accuracy and the quality of the collected data by eliminating the man-induced errors. With the higher speed of data collection in the present method, a higher number of measurements can be taken in less time thus increasing the quality of the measurements significantly. By properly adjusting the gas distribution based on the analysis of the collected data using this method, the emissions can be reduced by optimizing the ESP efficiency and lifetime of certain components can be increased. Present method is also advantageous for that fleet of ESP where gas distribution measurements are not possible due to too small space/gap between the field or between the fields and the gas screens for human access.

In accordance with one embodiment, for ESP where the movement of the probe carrier/air velocity probes may be obstructed by structural members of any kind, during the movement of the probe carrier, these obstacles are sensed through an sensors attached either on air velocity probe or probe carrier and the air velocity probes are retracted/enfolded automatically to cross that obstacle.

In accordance with one embodiment, the probe carrier stops at defined distances on the surface of each collecting electrode for a defined time period for measurement of air velocity. Depending upon the size of the ESP and the number and the size of the collecting electrodes, measurement points at defined distances can be fixed to ensure that air velocity readings have been taken at all required position on the collecting electrode and all such readings can be displayed in display controller.

In accordance with one embodiment, probe carrier can comprise two or more air velocity probes, such velocity probes being installed in such a way that when the probe carrier moves along a collecting electrode, said velocity probes project on each opposite sides of said collecting electrode, thus measuring the air velocity between adjacent collecting electrodes.

In accordance with one embodiment a method measuring sneakage across the ESP includes the steps of installing inside the ESP, at least one probe carrier comprising at least one air velocity probe adapted to collect and record air velocity readings; sending the probe carrier directly to either end of the collecting electrode towards roof and hopper of the ESP, capturing the air velocity reading beyond the either end of the collecting electrode towards roof and hopper of the ESP.

Another object of the present invention is to provide a system, which is adapted for measuring the gas distribution in such a manner that increases the efficiency of the ESP, to reduce the emission of dust particles.

This object is achieved by an automated gas distribution measurement system for measuring gas distribution in a ESP having a plurality of collecting electrode, the system comprises at least one probe carrier comprising at least one air velocity probe, adapted to collect and record the air velocity readings; and a display controller comprising means for storing, calculating and reporting the collected readings and means for controlling the movement of probe carrier remotely.

The gas distribution measurement system measures gas distribution quickly, across the cross section of an ESP with minimum manual interference. The man hour efforts required to carry out measurement of the gas distribution in a medium to large size ESP are reduced by more than 50% by using the present system. The system will allow making data collection at more points without additional efforts hence will improve overall quality of the result, particularly in large ESP. The system makes it possible to perform the measurement of gas distribution in the ESP, which has too small space/gap for human access inside the ESP for measurement. The automation of the system will also eliminate the need for operator to climb high in an ESP; hence will make the measurement method safer and more convenient. The system also records, does calculations and prepares report efficiently and reduces the skills required for calculations and reporting.

Another object of the present invention is to provide a probe carrier, which can hold itself while moving in vertical & horizontal directions on deformed, corroded and bending surfaces of collecting electrodes as well as walls and other structure of ESP and reach to a plurality of measuring points, recording the air velocity through air velocity probes.

The object is achieved by a probe carrier comprising—at least one air velocity probe, adapted to collect and record the air velocity readings, a control device adapted to receive air probe velocity readings, and a motion and clamping mechanism adapted to allow probe carrier to hold during movements.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
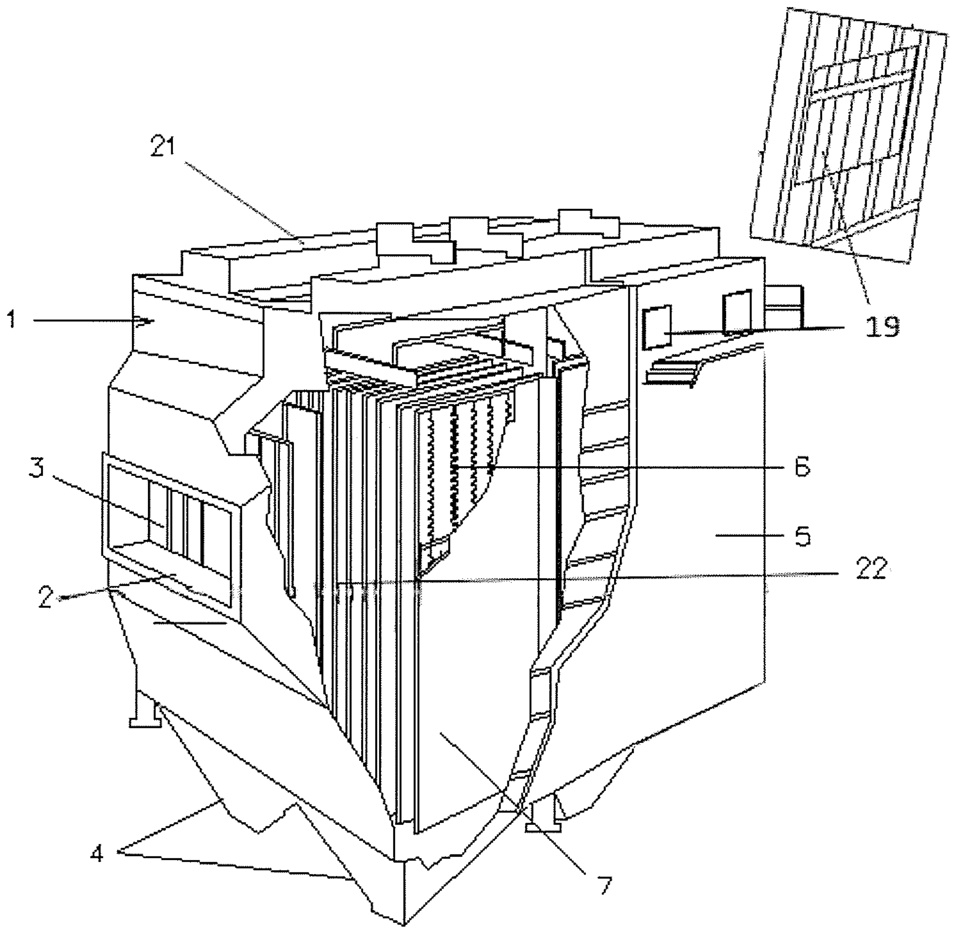
FIG. 1 shows a cross sectional view of an ESP as seen from perspective side.

In reference to FIG. 1, the ESP 1 has a general shape of a cubic casing 5 delimited by a roof 21 and a hopper 4, on the opposite side of the roof 21. Inside of casing 5 is accessible through an inlet 2. Gas distribution screens 3 are facing inlet 2 along casing 5 wall comprising said inlet. The gas distribution screens 3 facilitate uniform distribution of the flue gas in ESP that contains dust particles. The flue gas may, for instance, come from a boiler in which coal/waste is combusted. The casing 5, is divided in number of fields 22 along the length, each field 22 having a set of collecting electrodes 7, discharge electrodes 6 and hoppers 4. The collecting electrode 7 is shown in form of a plate and discharge electrodes 6 are shown attached to the frame from roof 21 of the ESP. When the flue gas passes along the discharge electrodes 6, the dust particles get charged and travels towards the collecting electrodes 7 where the they will be collected and move down and leave the casing 5 through hoppers 4. An entry into ESP 1 is provided through ESP manhole 19.

Figure 3:
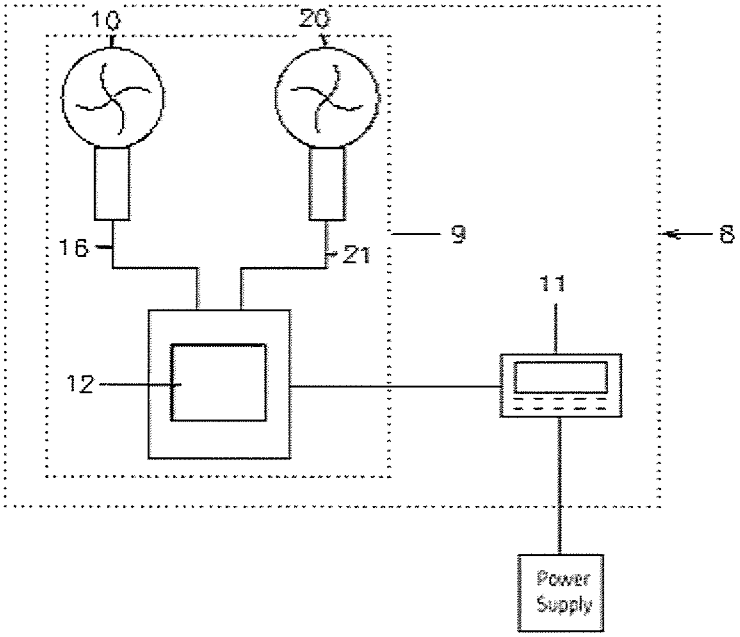
FIG. 3 is a simplistic sight in plan of gas distribution measurement system of the ESP.

FIG. 3 illustrates the gas distribution measurement system 8. For gas distribution measurement, the gas distribution measurement system 8 is placed inside the ESP 1. The gas distribution system 8 comprises at least one probe carrier 9 adapted to collect and record the air velocity readings, and a display controller 11 comprising means for storing, calculating and reporting the collected readings and means for controlling the movement of probe carrier 9 remotely.

Figure 2A:
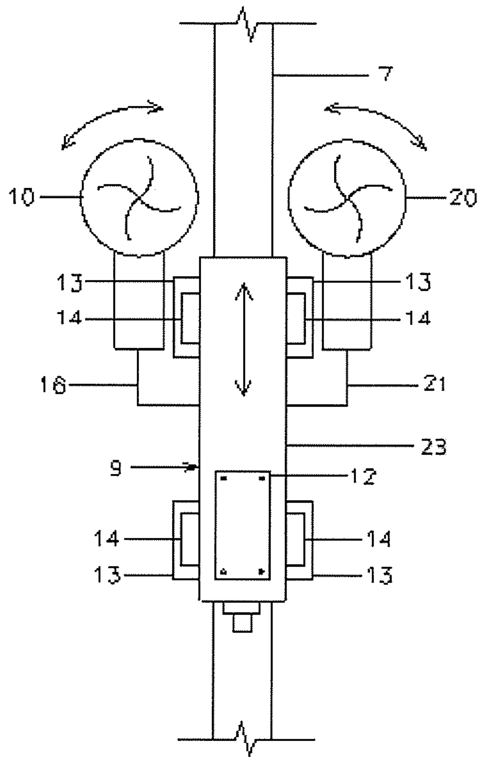
FIG. 2*a* is a simplistic sight in plan of the probe carrier of the gas distribution measurement system.

In reference to FIG. 2 the probe carrier 9 comprises a main body 23 to which one or more air velocity probes are mounted for instance two here 10, 20 in an articulated way through connector arms (16, 21). The probe carrier 9 also comprises of a control device 12 which assist in controlling all the movements of probe carrier 9 and air velocity probes 10, 20 via communication through display controller 11. The probe carrier 9 has a motion and clamping mechanism (for example magnetic/vacuum/mechanical) 14 that provide clamping force and motion and a plurality of guides 14 to avoid lateral shifting during movements on electrode surface. The motion and clamping mechanism provide sufficient grip and friction to over come slippage of the probe carrier 9 and move. The motion and clamping mechanism 13 also helps the probe carrier 9 to stop at required positions and avoids falling of the probe carrier 9 from heights. A DC/Servo motor is used to drive the motion and clamping mechanism 13 with suitable transmissions. The design of motion and clamping mechanism 13 will enable the probe carrier to maneuver successfully the defects/deformations and thick dust layer that can be present on collecting electrode 7 edges or surfaces during it movements.

It also has a mechanism comprising of connector arms 16, 21 which holds the velocity probes and can extend the velocity probes in the gap between the collecting electrode 7 both side to take measurements and retract the probes back when encountered with any obstacle in probe's path. The probe carrier 9 carrying air velocity probes (for instance two 10, 20, one on each side) move on the surface including end profile/edge of the collecting electrode 7 to position the air velocity probes 10, 20 at desired position across the cross section of the ESP 1.

In accordance with one embodiment the air velocity probe extend through a contractible/rotatable connecting arm which retract the air velocity probes when there is an obstacle in its path.

The movement and positioning of the probe carrier 9 will be controlled remotely through display controller 11. The display controller 11 facilitates interfacing with the hardware as well as storage, and compilation of the data. It also does calculations and report preparation independently or facilitate quick and easy transfer of data to external device like computer for doing this.

The probe carrier 9 moves quickly having air velocity probes 10, 20, so that measurement for example at around 600 points can be completed in less than 3.5 hours including installation and removal time of the probe carrier 9. The probe carrier 9 can be held stationary at each measurement point for required time for example 10 sec to capture the average air velocity by making air velocity probe 10, 20 stationary. The probe carrier 9 can place air velocity probes perpendicular to the direction of airflow while taking the measurement, with a tolerance of +5 deg. The probe carrier's 9 positional accuracy for example is within range of 50 mm. There is an alarm in case of any stuck up or malfunctioning of probe carrier 9.

In an exemplary embodiment, the motion and clamping mechanism 13 is comprising of magnetic wheels. The collecting electrode 7 are made of metallic material may be carbon steel and high-powered permanent magnets can be used for providing the necessary amount of gripping force for the motion and clamping of probe carrier on collecting electrodes. This also provides sufficient friction to overcome the slippage of the probe carrier 9. Basically motion and clamping mechanism help the probe carrier to reach to measurement heights/points and stop at required positions and avoids its falling from heights. In other exemplary embodiment different types of motion and clamping mechanism 13 as suction pads/tracks/grippers/clamps/legs/magnets etc can also be considered. The probe carrier 9 also has a plurality of guides 14 on sides to avoid lateral shifting while moving.

In an exemplary embodiment the probe carrier 9 can move on the walls as well as other surfaces of the ESP in any direction.

The air velocity probe 10 is lightweight and compact to meet the space constrains of the gas distribution measurement system 8. Air velocity probe 10 is vane type with air velocity measurement range is 0.30 to 30 meter/sec depending upon the type of ESP. The air velocity probe will provide 0-20 mA or 0-5 V output corresponding to the velocity. The response time is less than 10 sec including stabilizing and communication time and it is suitable for working in dusty environment.

Air velocity probes are mounted on contractible connecting arms which can fold/rotate automatically if any obstruction is encountered while moving on the collecting electrode either through suitable sensors mounted either on probe carrier or connecting arms, or by input already fed in said display controller 11. These obstructions may be from the protruding frames of the adjacent discharge electrodes present in some ESP designs.

In an exemplary embodiment the main body 23 probe carrier 9 can be a drive pulley based measuring head where a measuring head is hanged between two drive pulleys from the top across the cross section of the ESP by means of wire. The measuring head carries air velocity probe 10 and is placed perpendicular to the direction of airflow. By activating the drive pulleys, positioning of air velocity probe 10 to require measuring points are achieved across the cross section of the ESP 1.

In an exemplary embodiment two air velocity probes 10, 20 are mounted on either ends of a telescopic arms. The drive is at the centre, which rotate the arms. With rotation and axial movement of arms, the air velocity probes 10, 20 can be positioned at measuring point across the cross section of the electrostatic precipitator. The probe carrier 9 is placed in between the fields 22 on the walking space in ESP.

As mentioned earlier the probe carrier has a control device 12 mounted on it as shown in FIG. 2. The control device 12 has a microcontroller with inbuilt memory, a signal conditioner and a motor controller. The microcontroller receives air velocity readings signals in range of 4-20 mA or 0-5 V via the signal conditioner, which are connected to the air velocity measurement probe 10. The microcontroller also receives signals form attached obstacle sensors on probe carrier 9 for detecting obstacles on the path of the probe carrier 9 and controlling accordingly the air velocity probe arm folding and extending. A servomotor/DC motor is used for air velocity probe arm folding and extending. The microcontroller controls the movement as well as speed of probe carrier 9 via a motor controller, which also includes a motion encoder that is used to detect the position of the probe carrier 9. The microcontroller also communicates with a display controller 11 for providing data and executing operational commands through the control unit. The control device 12 is connected with a display controller 11 through a signal cable and with a power supply through a DC power cable.

Considering the height of the ESP, the probe carrier 9 needs to cover approximately up to 15 meter height, the probe carrier 9 is provided with adequate length of power/signal cables (single multi-core cable) in case of wired communication.

In another embodiment, the control device 12 is integrated with the display controller 11. The control device 12 and the probe carrier 9 are interconnected by means of number of independent/common signal cables (for each component on the probe carrier 9). The power supply is from a source inside/outside of the ESP and is connected to integrated display controller and control unit box and subsequently connected to the probe carrier through a common power-signal cable or through separate cables.

In another embodiment, the control device 12 is stationary and kept inside the ESP. It is connected with probe carrier with suitable common power-signal cable or through separate cables. With the display controller 11, it is connected either through a suitable wire or wirelessly. The power supply is from a source inside/outside of the ESP and is connected to the control unit box and subsequently connected to the probe carrier through the cable as described.

Figure 2B:
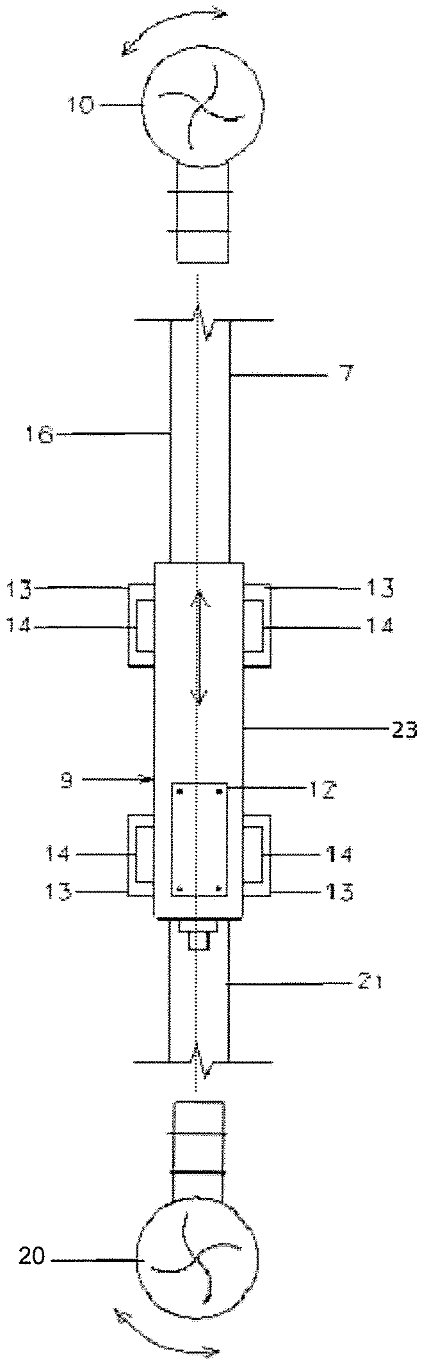
FIG. 2*b* is a simplistic sight in plan of the probe carrier with rotatable air velocity probes of the gas distribution measurement system.

In another embodiment, FIG. 2*b* displays the probe carrier 9 with arms retracted by rotation to overcome the obstacles during the movement in ESP.

Figure 4:
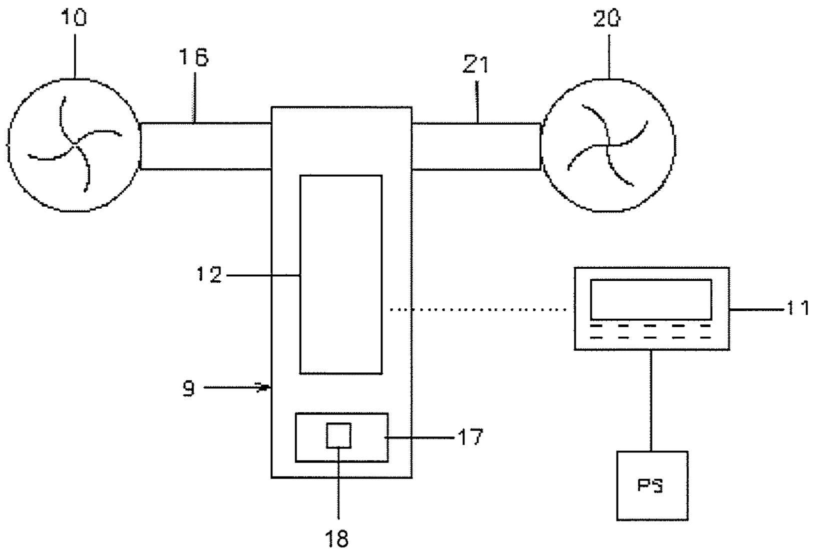
FIG. 4 is a simplistic sight in plan of the wired/wireless control device for controlling the probe carrier.

In another embodiment, FIG. 4 displays the control device 12 mounted on the probe carrier 9. Power supply is given onboard through a battery 17 and a transmitter 18 is present for wireless communication. The control station has a receiver for wireless communication along with power supply unit and display controller 11. There is no physical connection between the control station and probe carrier 9. All communication is through wireless shown in dotted line.

The display controller 11 is an interfacing devise and enable the operator to monitor and control the all operation/functions of gas distribution system 8 for example probe carrier 9 motion including its positioning and speed, velocity reading, folding/unfolding of connector arms, etc. The display controller 11 is comprises of a memory having embedded application software adapted to store all measured readings taken during measurement of gas distribution across the ESP; a microcomputer and a key pad. The display controller also has power supply and interface board. The display controller 11 is user programmable to define the ESP size, field number, reading position etc. It will have manual as well as automatic mode option to provide enough flexibility to the operator. Display controller 11 has flexibility to adapt to different ESP sizes and configurations. Display controller 11 can also control multiple probe carriers simultaneously.

When readings are taken by air velocity probe 10 & 20, the control device 12 will send the data to the display controller 11 using certain communication protocol and after finishing the measurement inside the ESP, display controller 11 can connected to the computer through a suitable communication interface that may be via USB/RS232 and all the readings from memory will be imported to the computer. The data acquisition software in computer will correlate, calculate and display the data in presentable form (with color coding, graphs, etc.) and finally prepare the report.

For measurement of sneakage in ESP, the velocity probe can be mounted on probe carrier in parallel to the direction with the collecting electrode through a suitable probe holder 15 (not shown) which is an extended arm almost 700 mm long. When probe carrier 9 is at near the end of collecting electrode 7, the air velocity probe will extend beyond its end in the range of 500 mm towards roof 20 or hoppers 4. It will enable to take measurement of air sneakage in the gaps between electrode end and ESP roof 21 or hoppers 4.

The gas distribution measurement system 8 described above is lightweight and portable, can be carried through the ESP manhole 19 by an operator. The gas distribution system 8 is protected from dust and splashing water. The gas distribution measurement system 8 is easy and quick to assemble and to dismantle.

For carrying out the gas distribution test for example it is required to measure air velocity across the cross section of the ESP (complete width and full electrode height including approximately 600 mm below and above of electrode's ends for sneakage check). It is done in off line mode using the ID fans to create airflow inside the ESP 1. It is done by moving air velocity probe 10, 20 for example at the points in an imaginary grid of 1 (height)×0.3/0.25/0.4 (width) meter covering entire ESP cross section, which can be changed according to size of the ESP 1. The horizontal position of measuring point is at the centre between two collecting electrodes 7 and vertically the position is at one-meter interval from bottom point of collecting electrode 7. Measurements shall be taken as close as possible to the plane containing end faces of the collecting electrode 7 just at the exit of air from collecting electrodes. The data collected from the measurements is compiled in a table and the coefficient of variant Cv shall be calculated on the whole as well as for individual four quadrant across the cross section of the ESP 1 and average value along the column and row shall also be calculated. The variation in air velocities at individual measuring points shall be highlighted for example using the appropriate color coding to give an overview of the gas distribution across the cross section of the ESP 1.

Figure 5:
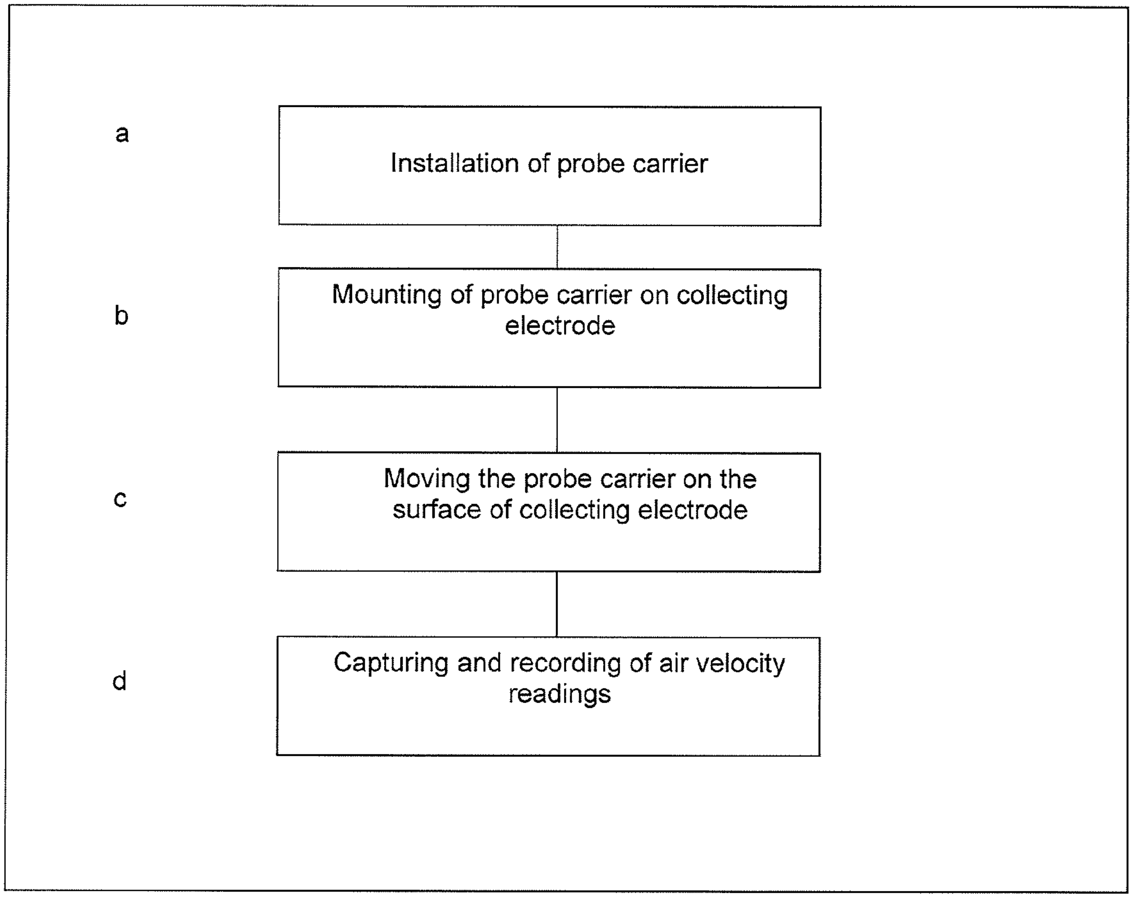
FIG. 5 is a block diagram for the method for measuring gas distribution.

FIG. 5 shows a block diagram of the method according to invention. The method begins when operator brings the gas distribution measurement system 8 inside the ESP. In step A at least one probe carrier 9, having at least one air velocity probe 10 which is adapted to collect and record air velocity readings, is installed inside the ESP 1. The readings are than compiled and analyzed and a test report is prepared automatically.

For doing the gas distribution measurement using this system, the probe carrier 9 is taken inside the ESP 1 through manhole 19 from roof or through openings on hopper side of ESP depending upon the design. As first step, the probe carrier is assembled with two-air velocity probe 10, 20 on its side 180 degree apart and all the wiring is connected between the probe carrier, air velocity probe, control unit (if required), display unit and power supply. Marking is done for all the collecting electrodes 7 starting from first, which is nearest to one of the ESP 1 wall.

The probe carrier 9 is mounted on the collecting electrode 7 surface for instance on edges such that it moves on edge surface with locked in position through side locking pins. Provide necessary command to start the measurement through display controller 11. The probe carrier 9 starts moving up with a predefined velocity on the collecting electrode 7 edges. It will stop at points of vertical measurement at defined height for example maximum 10 sec. The air velocity values and the probe carrier 9 positions will be displayed on the display controller 11 and are stored in the memory through the control device 12 present on the probe carrier 9.

The probe carrier 9 will reach to the roof side stopping at measuring points to capture the air velocity readings. After reaching at the end of collecting electrode 7, the probe carrier 9 will start coming down at fast speed without stopping in between. In other way doing this, the probe carrier can go to the roof side end of electrode at high speed without stopping and take the measurements by stopping at said position while coming down.

If there are obstacles in path of the air velocity probe from adjacent electrode frame, the connector arms will fold/retract the velocity probes automatically to cross that obstacle. For example if the obstruction button was activated earlier, the cells that are just below and above the obstructions are highlighted on the display controller. The connector arms 16, 21 will retract automatically after and before the measurements on these cells respectively. While returning, the connector arms 16, 21 will remain folded in this scenario. The sensing of the obstruction can be done either using a sensor or by calculation based on the input already fed. If the measuring point elevation is same as that of obstruction, these cells will be highlighted and on default the air velocity probe 10 will take measurement 120 mm above that point. However provision is available to skip the measurement for that point or take it through the manual mode.

When the probe carrier 9 is back, side locking pin will be released and the probe carrier 9 will be mounted on the alternate collecting electrode 7 and the procedure will be again repeated taking the alternate collecting electrode 7 till all the collecting electrodes are covered.

Having two air velocity probes 10, 20 projecting on both sides of a collecting electrode 7 facilitate covering the measurement area on both side of collecting electrode. It results in half number of required movements of probe carrier that greatly reduce the time period for measurements. Movement of probe carrier 9 then can be planned on alternate collecting electrodes 7 as measurement for one side of any collecting electrode 7 is done in previous movement.

Mounting will be done by operator and can be done automatically with help of moving picking machine.

For measuring sneakage in ESP, the probe carrier with the velocity probe attached in parallel direction to the collecting electrode through probe holder/extended arm, directly moves to any end (toward the roof or the hopper) of the collecting electrode at fast speed and stops automatically near its end by sensing the end through a sensor. Now the air velocity probe which is extending 500 mm in the gap between roof 20 or hopper and collecting electrode end takes reading of air velocity in this gap.

Using the application software in display controller 11 or computer data like operator details, date and time, site name, the ESP size designation, job reference no., customer name, purchase order no., test number, pass name and ESP information like collecting electrode height, electrode spacing, selection of measurement grid, numbers of electrode, measurement option like alternate grid point or all grid points, numbers of probe carrier to be used, obstruction activation and deactivation, obstruction elevation from collecting electrode 7 bottom point, obstruction gap, sneakage measurement can be fed or opted initially.

The previously described versions of present invention have many advantages, including that it speeds up and simplifies the measurement of gas distribution in ESP. The method of present invention not only ensures the safety of operator by eliminating the need for operator to climb high in ESP and reducing his residual time in dusty ESP but also improve significantly accuracy and quality of collected data by eliminating the man-induced errors. With the higher speed of data collection in the method of present invention, a higher number of measurements can be taken in less time thus increasing the quantity of measurements significantly. By properly adjusting the gas distribution based on the analysis of the collected data using this invention, the emissions can be reduced by optimizing the ESP efficiency and lifetime of certain components can be increased. Present invention is also advantageous for that fleet of ESP where gas distribution measurement is not possible due to too small space/gap for human access inside the ESP.

The man-hour efforts to carry out measurement of gas velocity distribution in medium and large size ESP are reduced by more than 50% by using present invention. The control system also record and report efficiently reduce the skills required for calculations and reporting.

All the features disclosed in the specification (including any accompanying claims, abstracts and drawings) may be replaced by alternative features serving the same, equivalent or similar purpose, unless expressly stated otherwise. Thus, unless expressly stated otherwise, each feature disclosed is one example only of a generic sense of equivalent or similar feature. The invention, of course, is not restricted to the exemplary embodiment described.

We claim:

1. A method for measuring gas distribution in an electrostatic precipitator with at least one collecting electrode, comprising:

a) installing inside the electrostatic precipitator on a surface of the collecting electrode, at least one remotely controlled probe carrier comprising at least one air velocity probe adapted to collect and record air velocity readings; and b) moving by remote control the probe carrier along the surface of the collecting electrode to cover an entire cross section of the electrostatic precipitator to capture and record a plurality of air velocity readings while moving the probe carrier along the surface of said collecting electrode.

2. The method according to claim 1, wherein the electrostatic precipitator has at least two collecting electrodes each with at least one remotely controlled probe carrier installed thereon.

3. The method according to claim 1, wherein during moving of the probe carrier, obstacles are sensed through an attached sensor.

4. The method according to claim 1, wherein moving of the probe carrier on the surface of the collecting electrode is stopped for a defined time period to measure air velocity.

5. The method according to claim 2, wherein each probe carrier has two or more air velocity probes projecting on both sides of the collecting electrode to measure air velocity between adjacent collecting electrodes.

6. The method according to claim 1, further comprising moving the probe carrier to either end of the collecting electrode toward a roof and toward a hopper of the electrostatic precipitator to capture the air velocity readings from either end of the collecting electrode.

7. A gas distribution measurement system for measuring gas distribution in an electrostatic precipitator having a plurality of collecting electrodes, the system comprising:

at least one probe carrier comprising at least one air velocity probe adapted to collect and record air velocity readings; and a display controller comprising means for storing, calculating and reporting collected air velocity readings, and remote control means for controlling movement of the probe carrier remotely along a surface of a collecting electrode to cover an entire cross section of the electrostatic precipitator to capture and record a plurality of air velocity readings.

8. A probe carrier for measuring gas distribution in an electrostatic precipitator comprising:

at least one air velocity probe adapted to collect and record air velocity readings;

a control device adapted to receive air probe velocity readings;

remote control means for controlling movement of the probe carrier remotely along a surface of a collecting electrode to cover an entire cross section of the electrostatic precipitator to capture and record a plurality of air velocity readings; and a motion and clamping mechanism adapted to allow the probe carrier to hold during movements.

9. The probe carrier of claim 8, wherein the air velocity probe extends through a contractible connecting arm.

10. The gas distribution measurement system of claim 7, wherein the probe carrier includes a plurality of guides to avoid lateral shifting during movement.

* * * * *